United States Patent [19]
Chang

[11] Patent Number: 5,828,034
[45] Date of Patent: Oct. 27, 1998

[54] WARMED COMPUTER INPUT PERIPHERALS FOR KEEPING A COMPUTER USER'S HAND AND FINGERS WARM AND COMFORTABLE

[76] Inventor: Wen-Lung Chang, c/o Chang Enterprises, Inc., 915 Linden Ave., South San Francisco, Calif. 94080

[21] Appl. No.: 779,000

[22] Filed: Jan. 3, 1997

[51] Int. Cl.$^6$ .............................. H05B 1/00; H05K 5/00; H05K 7/20
[52] U.S. Cl. ......................... 219/209; 361/679; 361/701; 361/704
[58] Field of Search .................................... 219/209, 520, 219/552, 553; 361/679, 680, 683, 686, 696, 697, 701, 704, 709, 711, 712, 713

[56] References Cited

U.S. PATENT DOCUMENTS

| | | | |
|---|---|---|---|
| 5,237,486 | 8/1993 | LaPointe et al. | 361/687 |
| 5,313,362 | 5/1994 | Hatada et al. | 361/709 |
| 5,331,510 | 7/1994 | Ouchi et al. | 361/702 |
| 5,402,311 | 3/1995 | Nakajima | 361/687 |
| 5,476,491 | 12/1995 | Mayn | 607/111 |
| 5,513,070 | 4/1996 | Xie et al. | 361/687 |
| 5,557,500 | 9/1996 | Baucom et al. | 361/687 |
| 5,568,360 | 10/1996 | Penniman et al. | 361/687 |

*Primary Examiner*—Teresa J. Walberg
*Assistant Examiner*—Sam Paik
*Attorney, Agent, or Firm*—David E. Newhouse

[57] ABSTRACT

Computer input peripherals such as keyboards, mouse pointers, mouse pads, wrist rests and the like are described which include an internal or external source of thermal energy for radiantly, conductively and/or convectively keeping a computer user's hands and fingers warm and comfortable in cold environments.

7 Claims, 7 Drawing Sheets

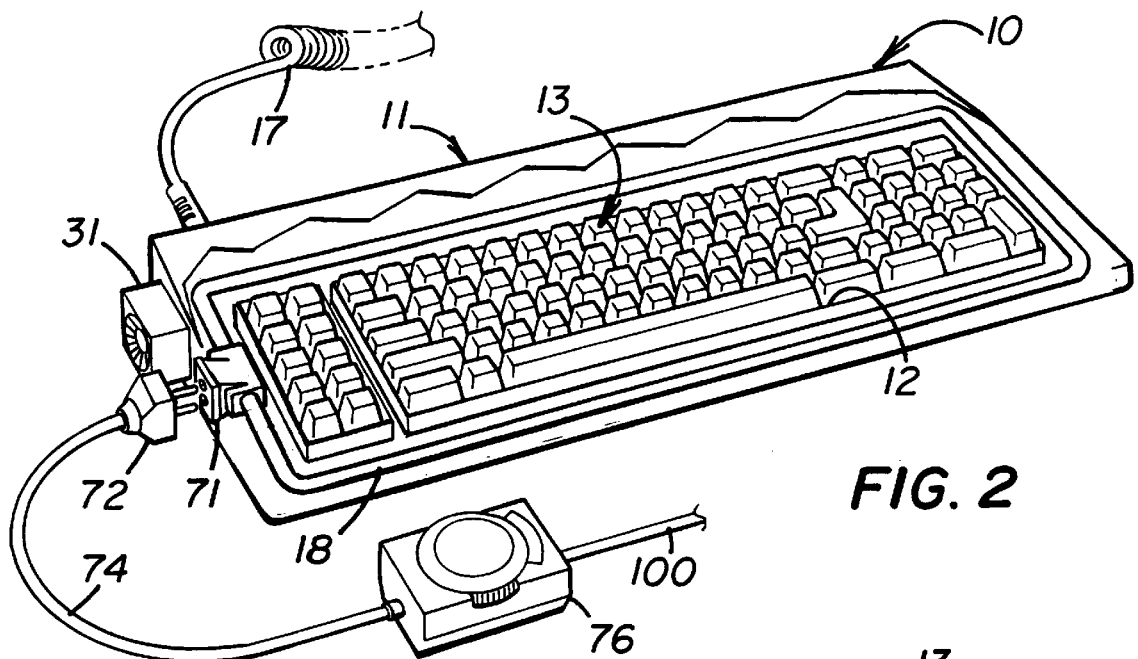
FIG. 2
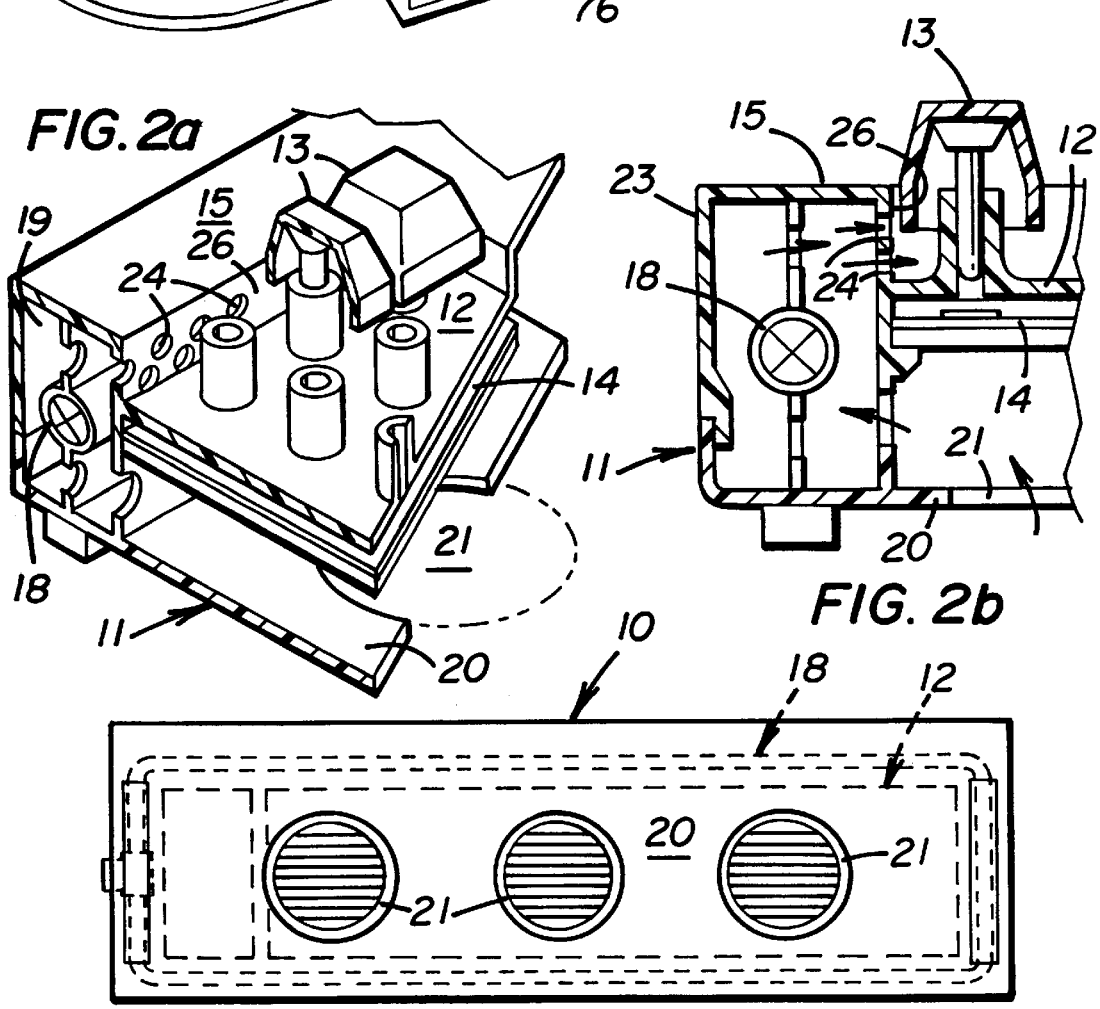
FIG. 2a
FIG. 2b
FIG. 2c

WARMED COMPUTER INPUT PERIPHERALS FOR KEEPING A COMPUTER USER'S HAND AND FINGERS WARM AND COMFORTABLE

BACKGROUND OF THE INVENTION

1. Field of the Invention

The present invention relates to warming of computer peripherals; in particular, to the use of heat sources in combination with computer input devices such as keyboards, mouse pointers, mouse pads, wrist rests and the like to provide a warm or heat radiating surface for keeping a user's hands and fingers comfortable in cold environments.

2. Description of the Prior Art

Computer users frequently spend many hours manipulating computer input peripherals with their hands inputting or obtaining data from computer terminals and personal computers. Computer users also tend to rest their hands in exposed and often elevated positions on such input devices which means, in cold environments, their fingers and hands can become uncomfortably cold in a relatively short time.

Plastics typically chosen for outer shells of computer input peripherals such as a keyboard or a mouse further exacerbate this problem. Typically, such plastics are heat insulators with low thermal conductivity. Thus, a plastic surface of the typical computer keyboard or mouse tends to mirror or match the temperature of the surrounding environment. And, because the manipulating hands and fingers do not maintain constant contact with such input devices, they do not warm significantly when handled.

Temperature control mechanisms and methods for cooling computer input peripherals are not unknown. For example, U.S. Pat. No. 5,513,070, Xie. shows a heat pipe connecting a metal plate with an integrated circuit surface mounted to a circuit board, to dissipate the heat generated by the integrated circuit. Then, U.S. Pat. No. 5,476,491, Mayn describes a keyboard wrist rest having an interior pocket filled with gelatinous substance that can be cooled for maintaining the wrist rest cooler than the surrounding environment for an extended period of time.

However, prior art references do not disclose, teach or suggest mechanisms for warming computer keyboards, mouse pointing devices, mouse pads, wrist rests and the like for keeping a users hands and fingers warm, and comfortable in cold environments. Even at normal room temperatures, finger and hands of many computer users frequently become uncomfortably cold because of circulation and other anomalies.

SUMMARY OF THE THE INVENTION

Computer input peripheral devices such as keyboards, mouse pointers, mouse pads, wrist rests and the like in combination with a heat source are described for radiantly, conductively and convectively keeping user's fingers and hands warm and comfortable in cold environments. In particular, thermal energy from an internal or external heat source is introduced beneath the exterior shell surfaces of such input peripheral devices for conductively, radiantly and/or convectively warming exterior surfaces of the input device normally in contact with or beneath a user's hands, and convectively directing warm air circulating through the device to flow onto for warming a user's hands and fingers.

The invented warmed computer input peripherals also contemplate control means enabling a user to set and adjust warmth of an input peripheral device.

A particular advantage of warming computer input peripherals is that the warmed device act as source thermal energy for convectively and radiantly warming of a user's hands even when they are not in contact with the input device. In particular, vents are formed through the outer shell surface of the input device such that air can convectively circulate through the device onto a user's hand and fingers located above the input device.

An aspect of the invention contemplates incorporating thermally conductive material into an otherwise low thermal conductivity matrix of materials enclosing the components of an input device (keys, roller ball etc.) proximate the heating element to provide both radiant and convection warming in areas normally handled by the user or proximate the user's wrists, hands, and fingers.

Another aspect of the invented warmed computer input peripherals contemplates a heating element characterized by a well-defined upper temperature limit such that the heating element can not overheat burning a user or cause damage to physical and electrical components of the device. In fact, a primary design objective of the invention is to assure minimum risk due to a malfunction of the heating element.

Still other aspects of this invention contemplates circulating air warmed by other components of the computer system, e.g. the CRT monitor or the CPU, into the input peripherals analogous to a forced air heating system.

Still other features, aspects, advantages, and objects presented and accomplished by the invented warmed computer input peripherals such as keyboards, mouse pointers, mouse pads, wrist rests and the like will become apparent and/or be more fully understood with reference to the following description and detailed drawings.

DESCRIPTION OF THE DRAWINGS

FIG. 2, is a cutaway perspective view of a keyboard unit portraying the location of the heating element within the enclosing shell surrounding the input key tray of the keyboard unit.

FIGS. 2a, 2b & 2c are respectively, a partial side elevation cut away perspective view, a partial side elevation plan view and a bottom plane view of a keyboard input device showing various possible relationships of the heating element, the enclosure shell, air input vents and output vents, the input key tray, and the printed circuit board strike surface beneath the input key tray.

DESCRIPTION OF PREFERRED AND EXEMPLARY EMBODIMENTS

Keyboard

Figure 1:
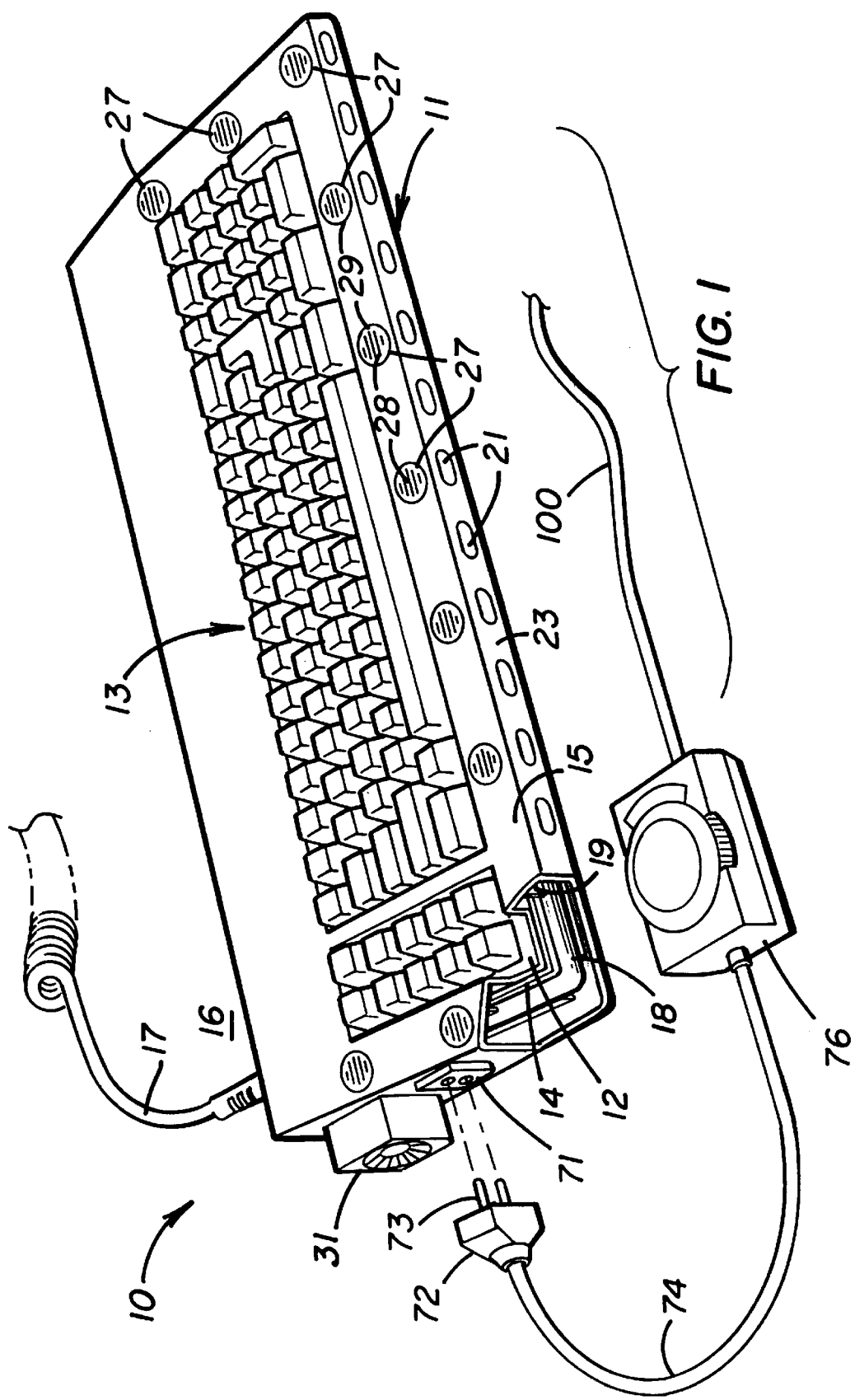
FIG. 1 is a perspective view of an invented computer keyboard in which an electrical heating element is located within an enclosing shell surrounding an input key tray for convectively circulating and directing warm air into the input key tray to flow outward onto a user's hands with associated electrical power supply and control components.

As shown in FIGS. 1, 2, 2a–2c, a warmed input keyboard unit 10 per the present invention includes an plastic shell frame structure 11 surrounding and supporting an input key tray 12 and input keys 13. The frame structure 11 also supports a printed circuit board strike surface 14 for detecting depressed or struck keys 13. Associated keyboard signal processing circuitry (not shown) processes and transmits such data to a computer (not shown) via a conventional, preferably shielded, twisted wire cable 17. Such signal processing circuitry is conventionally located and supported within an enclosed space 16 by at the back of the keyboard unit 10. An electrical heating element 18 is conventionally supported or fixed within a hollow volume 19 defined between the frame structure 11 and a top exterior shell 15. Ideally, the hollow volume 19 is a closed tube such that heat energy radiated by the heating element 18 is thermally isolated to a degree from keyboard signal processing circuitry elements. Frame elements 20 supporting the heating element 18 within the tubular volume 19 should be perforated to allow for air circulation. Input air vents 21 can be located through the bottom walls 22, side walls 23 of the frame structure 11 and even the bottom 20 of the keyboard unit 10 (FIG. 2c) to allow air to circulate into the interior tubular volume 19. In particular, a careful designer should locate the input air vents 21 such that air flow into the keyboard unit cools temperature sensitive components. The skilled circuit designer should also select required keyboard signal processing circuitry components that operate efficiently and are not sensitive to expected variations in temperature ranging up to 120° F. Output air side vents 24 can be located through the upper end 26 of interior side walls 23 defining the tubular volume 19 to direct warmed air to flow horizontally into the input key tray 12. (See FIGS. 2a & 2b) Also, directional output air vents 27 (FIG. 1) can communicate through the top exterior shell 15 which include inclined vanes 28 rotatable within a frame 29 for directing convection air flow out of the hollow volume 19 defined between the frame structure 11 and the top exterior shell 15.

Alternatively, an air fan 31 can circulate or drive air into the tubular volume 19 for warming by the heating element 18. The driven warmed air could then similarly be directed by output air side vents 24 into input key tray 12 and/or directional top vents 27 for warming hands and fingers of a user located above the keyboard unit 10.

Figure 9:
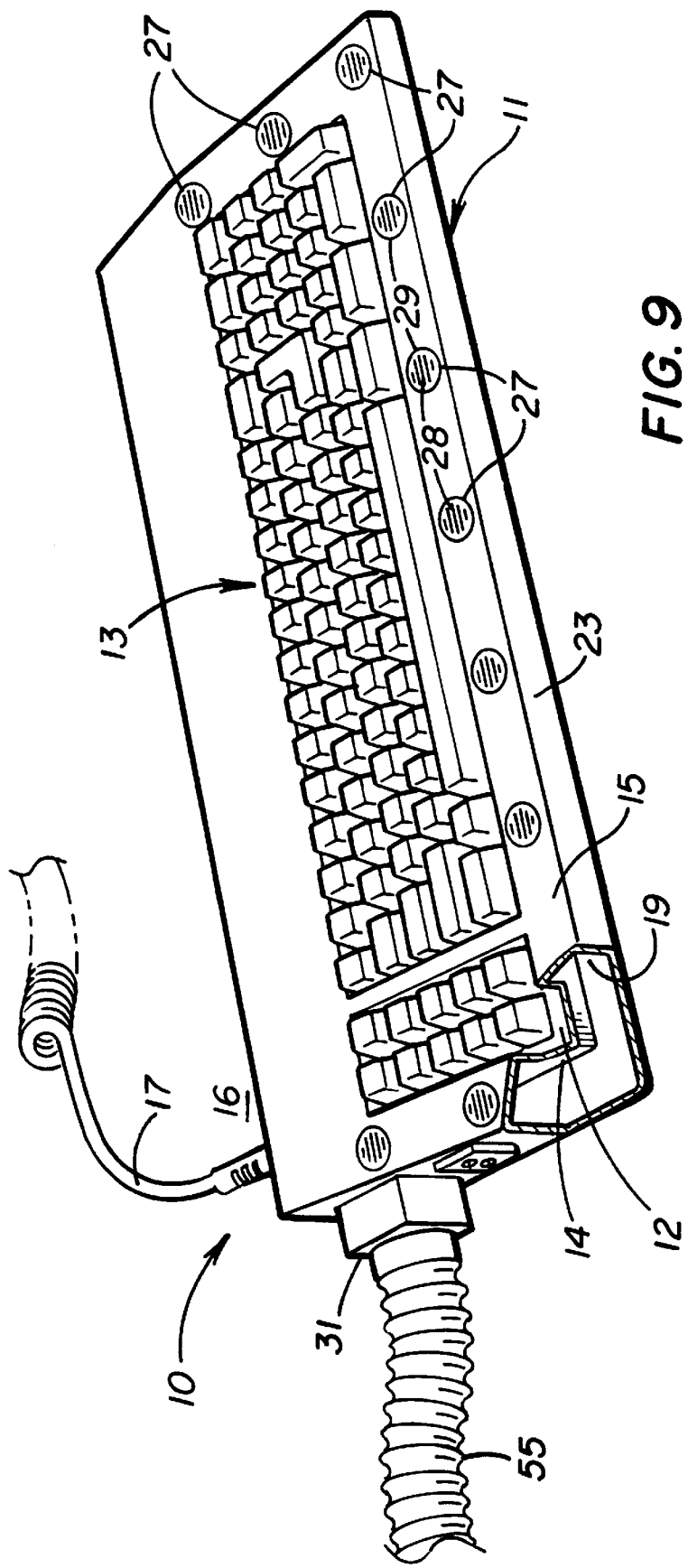
FIG. 9 is a perspective view of an invented computer input peripheral unit where air warmed by an external heat source is piped into an enclosing shell surrounding the input key tray with vents for directing the warm air tray to flow outward onto a user's hands above the unit.

Then, looking at FIG. 9, air warmed by an external source is piped or 'forced' via a flexible tube 55 connecting to the hollow volume 19 defined between the frame structure 11 and the top exterior shell 15 of a typical keyboard input unit. The 'forced' warmed air could then similarly be directed by output air side vents 24 into input key tray 12 and/or directional top vents 27 for warming hands and fingers of a user located above the keyboard unit 10. Possible sources of such warmed air include a conventional external heating element (not shown) or the CRT computer monitor (not shown). Other suitable sources could be the case (not shown) containing the main (CPU) circuitry systems for the computer or the case for disk drive data storage units each of which typically have fans drawing air through the case for cooling the circuitry and other components within the case. In such forced air embodiments, the air fan 31 mounted on the frame structure 11 could boost air circulation provided by fans drawing cooling air through circuitry and component cases or even draw warmed air venting from vents of a case containing a CRT computer monitor which typically rely on convection for cooling.

Stationary Mouse/Joystick

Figure 3:
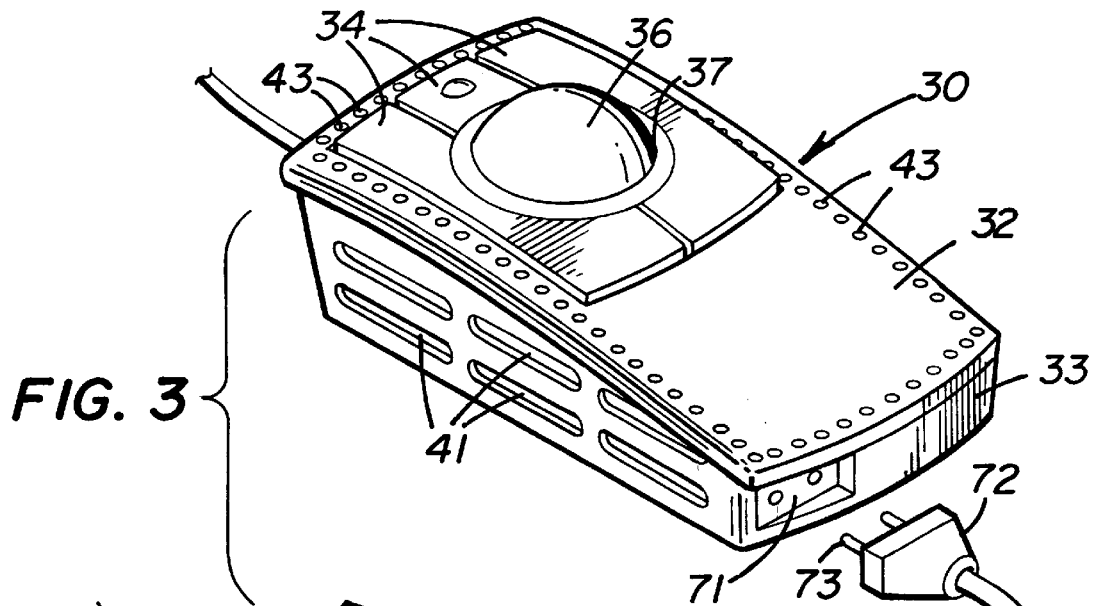
FIG. 3 is a perspective view of a stationary mouse pointer with an internal electrical heater and associated with associated electrical power supply and control components.
Figure 4:
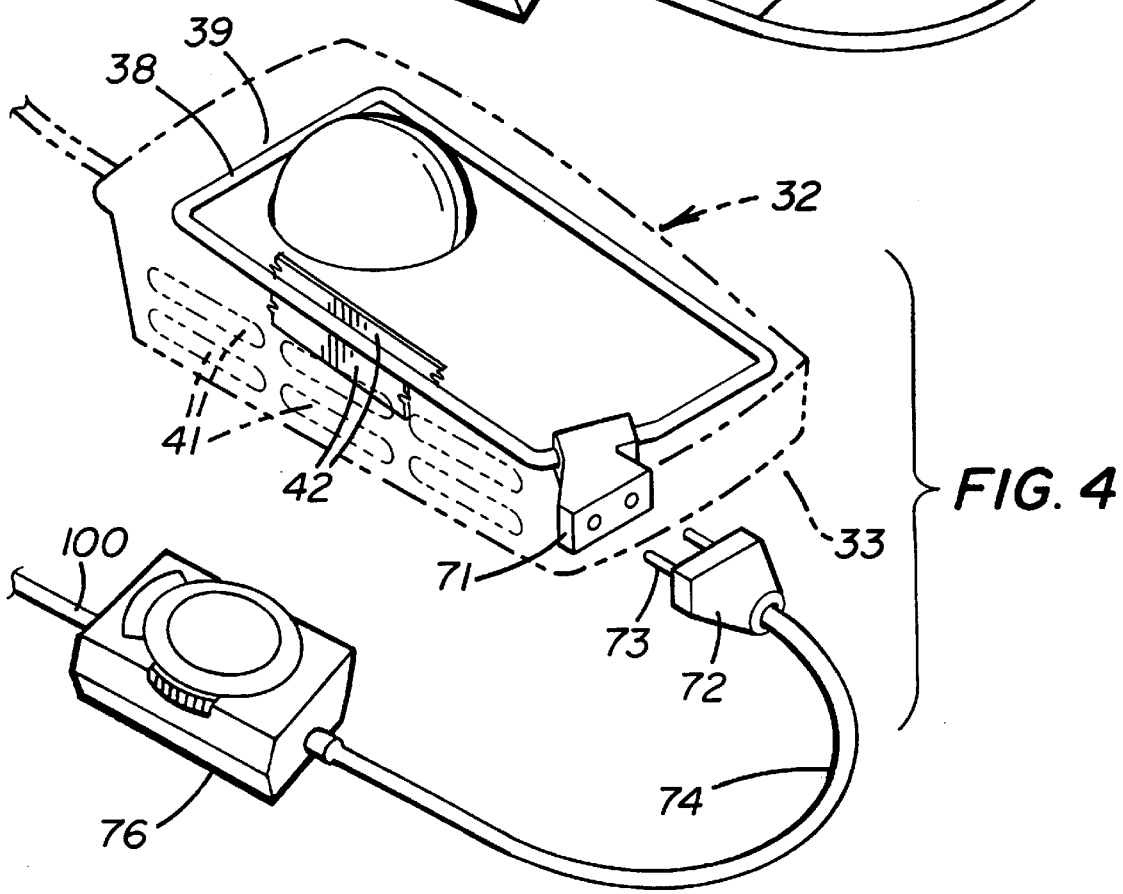
FIG. 4 is a cutaway perspective view of the stationary mouse of FIG. 3 portraying the location of the heating element underneath the exterior shell of the mouse.

Looking now at FIGS. 3 and 4, a preferred embodiment of a warmed stationary mouse or joystick pointer apparatus 30 includes an exterior plastic shell 32 supported by a structural base frame 33 with one or more depressable keys, pads or buttons 34 for sensing user "clicks" implemented by depressing the key, pad or button 34 with one or more fingers. Such user "clicks" are sensed by micro-switches (not shown) supported on the base frame 33 beneath the shell 32. Typically a ball 36 is supported for rotation within the base frame 33 via a port 35 through the plastic shell 32. When rolled, the ball 36 turns electronically monitored X-axis and Y-axis rollers (not shown) providing data for positioning a pointer in the plane of a display device driven by the computer. Such position data is typically communicated, along with user "click" signals, via an insulated twisted wire cable 17 to an associated computer (not shown).

In joystick stationary pointing mechanisms, typically an upright "joystick" (not shown) is supported by the base frame 33 and is grasped in the hand of a user and pivoted or tilted forward and backward and side to side. Sensors located proximate or below the support point of the 'joystick' provide X and Y axis electrical signal data for positioning the pointer in the display device driven by the computer. In the case of joystick pointing devices, typically depression sensitive keys, pads, buttons and the like are located on the joystick. However, similar to stationary roller ball pointers, the circuitry sensing and communicating position and key status data to the computer is located and supported by the base frame structure 33 which in turn is typically enclosed within a protective plastic shell 32 securable to the base frame 33.

As with the described warmed keyboard unit 10, a heating element 38 is fixed or supported within the enclosed volume 39 defined beneath the enclosing shell 32 and the base frame 33 supporting the rolling ball 36 or pivoting 'joystick. Ideally, the heating element 38 should be positioned to avoid directly heating any signal processing elements by conduction or convection. And, similar to the keyboard unit 10, described above, input air vents 41 should be located such that air flowing into the enclosed volume 39 tends to cool any components that have temperature sensitivity. Also, using conventional injection molding techniques, vertical partitions 42 can be internally formed with either the shell 32 or the base frame 33 such that the heating element 38 is completely enclosed in a tubular volume. Small input and output air vents 41 & 43 located above and below the heating element 38 respectively allow air to convectively circulate through the enclosed volume 39. Heated air venting via the vents 43 above the heating element 38 convectively warming a volume located above the shell 32 normally occupied by the hand of a user manipulating the ball 36 or 'joystick of the mouse.

Also, the ball 36 may be composed of a thermally conductive material such that air convectively circulating through the enclosed volume will warm the ball, which then effectively functions as thermal energy reservoir which warms the manipulating surfaces of a user's hands and fingers both by conduction and radiation. And, analogous to a thermally conductive ball 36, a 'joystick' could similarly be composed of a thermally conductive plastic or other material and be warmed by air convectively streaming up an axial passage through the stick. Alternatively, the heating element 38 could be mounted within such an axial passage.

Mouse Pad

Figure 5:
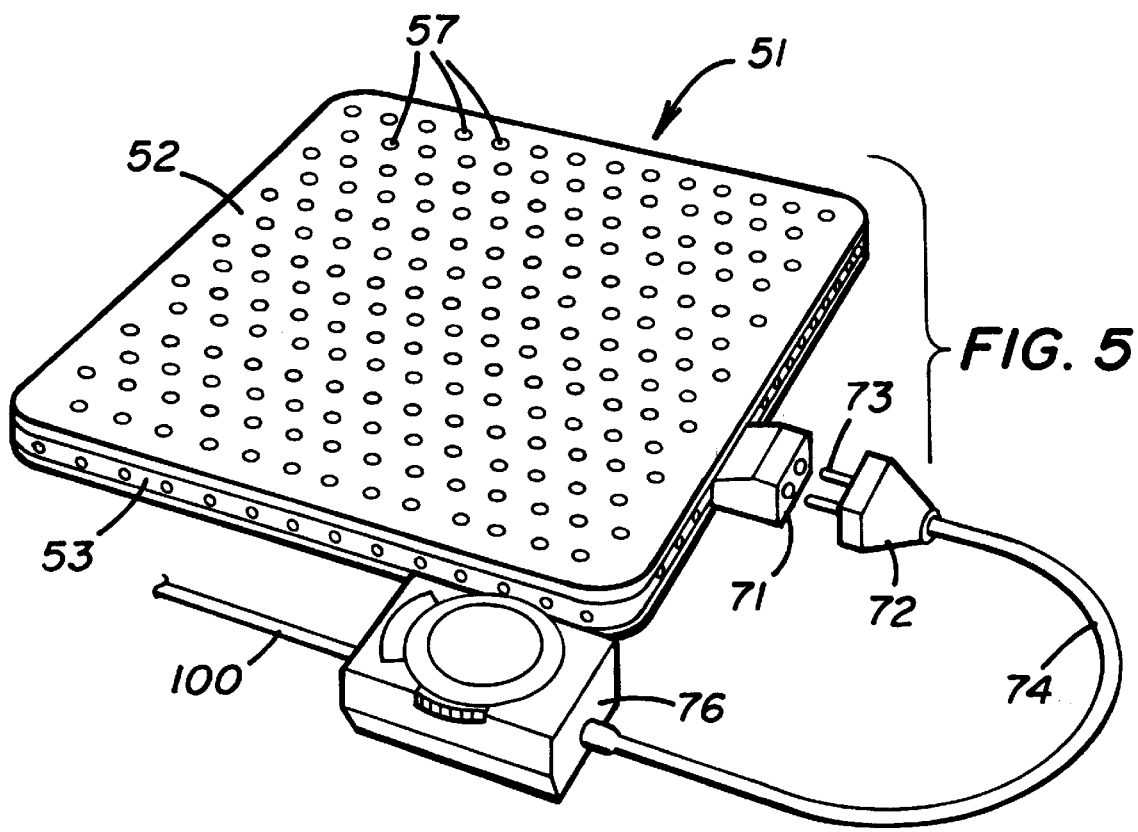
FIG. 5 is a perspective view of a thermally radiant mouse pad with an internal heating element which also includes a plurality of pores for allowing some air to convectively circulate into and through the body of the pad adjacent the heating element.
Figure 6:
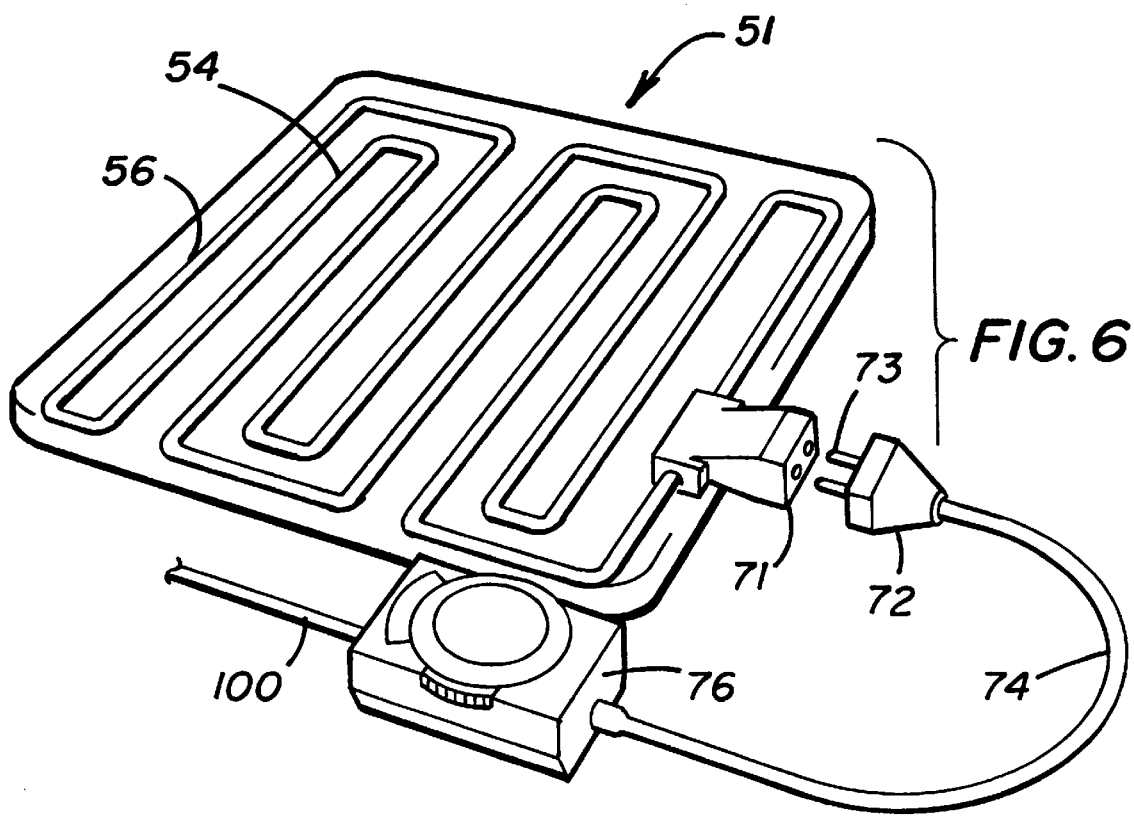
FIG. 6 is a cutaway perspective view of the invented thermally radiant mouse pad portraying the sinuous location of the heating element within the mouse pad.

As shown in FIGS. 5 and 6, a preferred embodiment of the invented warmed mouse pad 51 includes a top surface 52 formed of some flexible non-static material such as woven fabric or polyvinyl chloride, bonded to a bottom layer 53 formed of a flexible non-skid material such as thermoplastic foam. A heating element 54 is located in a channel 56 which winds in a sinuous snaking pattern cut into the bottom layer 53 beneath the top surface 52 of the mouse pad 51. A plurality of small pores 57 are drilled through the bottom thermoplastic layer 53 pad, particularly in regions adjacent the heating element 54 to allow for some air circulation into and around the heating element 54. In this case the heating element primarily heats the thermoplastic bottom layer 53 which in turn radiates thermal energy upward for warming a hand manipulating a conventional mobile mouse pointer on the top surface 52. Because the mouse pad 51 does not include any electronic signal processing circuitry, the upper limits on temperature can be somewhat higher than in the case of a heated keyboard unit 10 or stationary mouse pointer 30.

Wrist Rest

Figure 7:
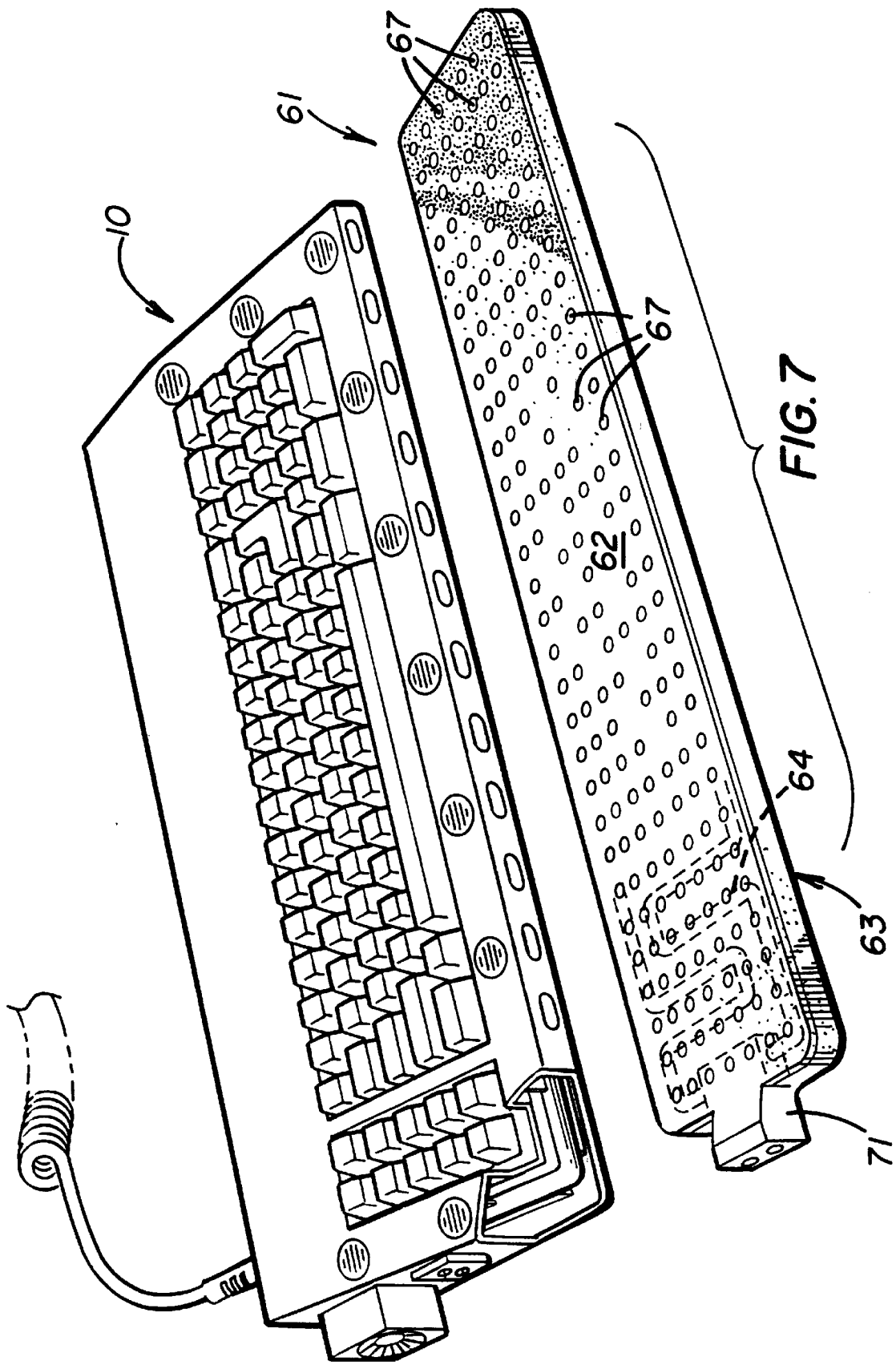
FIG. 7 is a perspective view of the invented wrist rest with an internal heating element including a plurality of pores for convectively allowing air to circulate into and through the body of the rest showing its position in front of a computer keyboard.
Figure 8:
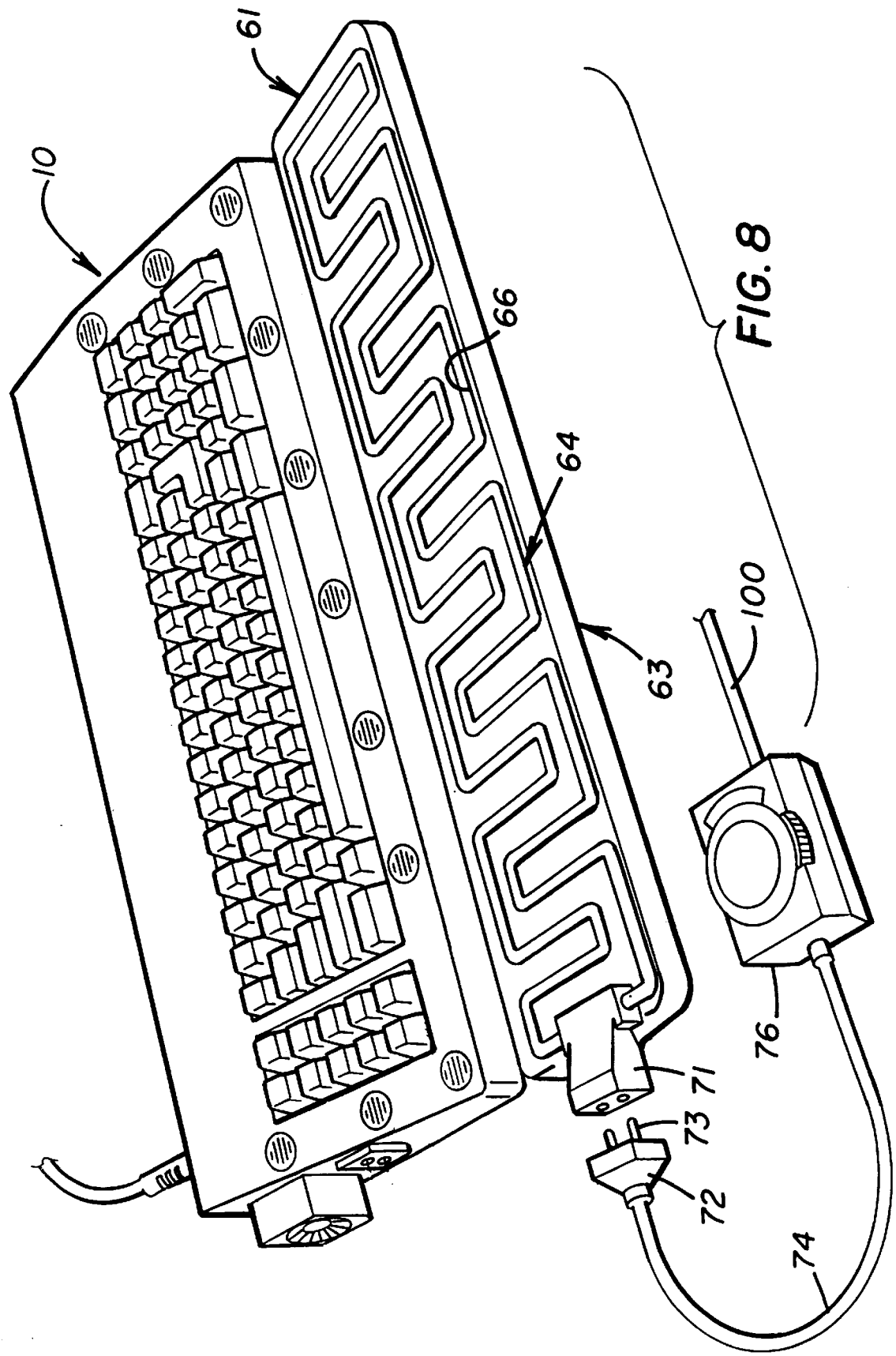
FIG. 8 is a cutaway perspective view of the invented wrist rest of FIG. 7.

Looking at FIGS. 7 and 8, a warmed wrist rest 61 is located for supporting the wrists of a user of in front of a computer keyboard unit 10, and includes a breathable top surface 62 covering a firm but yielding, body 63 composed of a non-skid, heatable material such as foam rubber or thermoplastic foam. Similar to the mouse pad 51 described above, a flexible heating element 64 is located in a sinuous channel 66 cut into the body 63 of the wrist rest 61 snaking underneath its entire upper breathable top surface. Pores 67 can be drilled into and through the body 63 of the rest 61 adjacent the heating element 64 to promote some air convection circulation into the volume above the rest 61 normally occupied by wrists of a user typing on the keyboard unit 10. As with the warmed mouse pad 51, the heating element primarily warms the body 63 of the wrist rest 61. However, in contrast to the warmed mouse pad 51 wrists and hands of a user contact the breathable top surface 62 and are warmed by conduction. Accordingly, it may not necessary to keep the wrist rest 61 as warm as the warmed mouse pad 51 in order to assure adequate hand comfort.

Preferably the respective heating elements 18, 38, 54 & 64 are formed from two spaced conductors surrounded by a positive temperature coefficient (PTC) material per the teachings of U.S. Pat. Nos. 5,451,757, Sullivan et. al, and 4,309,596, Crowley. In particular, Sullivan et. al. and Crowley each describes heating elements which increases in electrical resistance as its temperature increases, and thus do not exceed a certain maximum temperature. Such heating elements are also flexible and can be easily shaped or formed to fit within sinuously curved enclosed hollow volumes and channels which typically surround and support most computer input keyboards. As illustrated, the respective ends of the heating elements 18, 38, 54 & 64 electrically connect to a plug receptacle 71 mounted or supported on a vertical side of the particular warmed input device. A male plug 72 with prongs 73, plugs into the plug receptacle 71 and connects via an electrical power cord 74 to a control box 76. The control box 76 in turn is connectable to a conventional source of electrical power (not shown) via electrical cord 100. Control box 76 includes a conventional manual rheostat switch 77 which a user can turn the heating elements 18, 38, 54 & 64 on or off and to set and adjust relative temperatures of the warmed input device 10, 30, 51, and/or 61. Alternatively, the control box 76 could included several manual switches 78 in addition to an on-off switch 77 for establishing temperature set points which are then read by conventional microprocessor circuitry to control the degree of warmth provided by the heating element.[See for example, Sullivan et. al at col. 10, line 61—col. 12, line 2.] Other alternatives would include control circuitry and switches (control box 76) mounted and supported within the structure of an input device such as the keyboard unit 10 or stationary mouse pointer 30. In this latter instance, a sensor sensing temperature, either radiantly or electronically, within the device could be utilized to provide necessary feedback for conventional servo control of temperature within the unit.

In all such instances, the preferred control circuitry should also incorporate safety circuits which include conventional one shot fuses for interrupting electrical power to the control circuitry, as well as safety circuits that interrupt electrical power from the control circuitry to the heating elements 18, 38, 54 or 64 in the event of a short or open circuit condition in the heating elements. [See Sullivan et. al at Col. 12, lines 3–56 for an example of a suitable non-reset safety circuit]

The invention of warmed computer input peripheral devices for radiantly, conductively and convectively keeping a user's fingers and hands warm and comfortable in cold environments has been described in context of warmed keyboard units 10, a warmed stationary mouse pointer 30, a warmed mouse pad 51 and a warmed wrist rest 61. However, many modifications and variations of the invention can be made both with respect to the particular devices described and other analogous devices which, while not described above, fall within the spirit and scope of the invention as set forth in the appended claims.

I claim:

1. A computer input device for maintaining a computer user's hands and fingers warm and comfortable, comprising in combination:

a frame structure supporting a plurality of manually manipulative mechanisms for generating data signals transmittable to a computer;

a shell structure mounted on the frame structure providing an exterior surface with openings allowing for manipulation of the manipulative mechanisms by the computer user's hands and fingers, the mounted shell structure defining in combination with the fame structure, an interior volume beneath the shell structure;

an electrical heater element located within the interior volume beneath the shell structure for warming the enclosed interior volume and shell structure, and a source of electrical energy connectable to the heater element for energizing the heater element causing it to radiate thermal energy.

2. The computer input device of claim 1 wherein the shell structure and the frame structure each include air vents communicating into the interior volume for allowing air convection through the interior volume responsive to radiation of thermal energy by the electrical heater element to a region above the input device where hands and fingers of the computer user are normally positioned for manipulating the manipulative mechanisms of the input device.

3. The computer input device of claim 1 and further including means for circulating air into the interior volume beneath the shell structure for warming by the radiating electrical heater element, such warmed air exhausting from the interior volume via the openings through the shell structure allowing for manipulation of the manipulative mechanisms by the user's hands and fingers, the exhausting air warming both the manipulative mechanisms and the user's hands and fingers.

4. The computer input device of claim 3 wherein the manipulative mechanisms include movable structures with surfaces touched by hand and fingers of the computer user, the movable structures each being composed of a thermally conductive material, whereby, the computer user's hands and fingers touching the manipulative mechanisms are warmed by radiation, convection and conduction of the thermal energy emanating from the electrical heater element.

5. The device of claim 1 and further including:
 a temperature control means electrically connected between the electrical heater element and the source of electrical energy for regulating thermal energy emanating from the electrical heater element.

6. The device of claim 5 wherein the electrical heater element comprises two spaced electrical conductors surrounded by a positive temperature coefficient material in turn enclosed within an electrically insulative, thermally conductive material.

7. The device of claim 6 and further including:
 a safety control circuit for disabling the temperature control means by interrupting transmission of electrical energy from the temperature control means to the electrical heater element in the event of an electrical short or open circuit condition in the electrical heater element; and
 a replaceable fuse electrically connected between the temperature control means and the source of electrical energy for interrupting transmission of electrical energy to the temperature control means in the event of a short circuit.

* * * * *